United States Patent [19]
Katayama et al.

[11] Patent Number: 5,786,847
[45] Date of Patent: Jul. 28, 1998

[54] APPARATUS FOR ADJUSTING THE CONVERGENCE IN A STEREOSCOPIC IMAGE SYSTEM

[75] Inventors: Tatsushi Katayama, Setagaya-ku; Shigeki Okauchi, Kodaira; Masayoshi Sekine, Shinjuku-ku; Katsuhiko Mori, Kawasaki, all of Japan

[73] Assignee: Canon Kabushiki Kaisha, Tokyo, Japan

[21] Appl. No.: 659,182

[22] Filed: Jun. 6, 1996

[30] Foreign Application Priority Data

Jun. 9, 1995 [JP] Japan .................................. 7-143357

[51] Int. Cl.⁶ ........................................................ H04N 13/00
[52] U.S. Cl. .................................................. 348/47; 352/57
[58] Field of Search ............................... 348/47, 46, 48, 348/42, 699; 382/154; 352/57, 62

[56] References Cited

U.S. PATENT DOCUMENTS

| | | | |
|---|---|---|---|
| 5,140,415 | 8/1992 | Choquet | 348/46 |
| 5,369,449 | 11/1994 | Yukitake et al. | 348/699 |
| 5,499,051 | 3/1996 | Suda et al. | 348/47 |
| 5,563,652 | 10/1996 | Toba et al. | 348/699 |
| 5,602,584 | 2/1997 | Mitsutake et al. | 348/47 |

*Primary Examiner*—Amelia Au
*Attorney, Agent, or Firm*—Fitzpatrick,Cella, Harper & Scinto

[57] ABSTRACT

An image pickup apparatus comprising plural image taking systems for taking the image of an object and outputting image signals, a memory circuit for storing plural image signals output from the plural image pickup systems, a convergence angle setting unit for setting the convergence angle of the plural image pickup systems, and a trimming circuit for extracting, from each of the plural image signals stored in the memory circuit, the signal of a portion corresponding to the convergence angle set by the convergence angle setting unit.

23 Claims, 8 Drawing Sheets

CURRENT FIELD

FIG. 3B

PREVIOUS FIELD

FIG. 3C

MOTION VECTOR BETWEEN CURRENT FIELD AND PREVIOUS FIELD

SHIFT AMOUNT Δx ON CONVERGENCE ANGLE

LEFT IMAGE RIGHT IMAGE

FIG. 6

SHIFT AMOUNT Δx ON CONVERGENCE ANGLE

TRIMMING AREA OF CURRENT FIELD 601, DETERMINED BY MOTION VECTOR (x, y) FROM MOTION DETECTION UNIT 106

SYNTHESIZED TRIMMING AREA 602 ON SHIFT AMOUNT Δx DETERMINED BY CONVERGENCE ANGLE AND MOTION VECTOR (x, y)

TRIMMING AREA OF PREVIOUS FIELD

MOTION VECTOR (x, y)

CURRENT FIELD

CORRECTION OF
VERTICAL DIFFERENCE

FIG. 10B

PHASE MATCHING
BY MAIN OBJECT

FIG. 11

APPARATUS FOR ADJUSTING THE CONVERGENCE IN A STEREOSCOPIC IMAGE SYSTEM

BACKGROUND OF THE INVENTION

1. Field of the Invention

The present invention relates to a plural-eye image pickup apparatus, for taking the image of an object with plural image pickup systems thereby achieving stereoscopic view and input of distance information.

2. Related Background Art

In the plural-eye image pickup apparatus for providing a stereoscopic image by taking the image of an object with plural image pickup systems, it is already known to adjust the stereoscopic perception by controlling the convergence angle of the image taking systems.

In such apparatus, the adjustment of the convergence angle is generally achieved by activating a motor or the like provided in each image pickup system.

Also in taking the stereoscopic image, the vibration of the holding hand, for example, deteriorates the precision of stereoscopic image synthesis for stereoscopic viewing, thereby resulting in instability in the image synthesis or fatigue of the observer caused by the image involving vibration, but the reduction of such drawbacks has not been given much consideration in the past.

The conventional image pickup apparatus mentioned above requires certain mechanisms for controlling the convergence angle, and the apparatus inevitably becomes complex and bulky for this reason.

Also the mechanical play or the like in the control of the convergence angle results in an aberration between the images obtained by the respective image pickup systems, leading to an inconvenience in the stereoscopic viewing.

Furthermore, in case of a hand-held plural-eye image pickup apparatus, the vibration of the holding hand at image taking causes a vibration in the taken image, thus increasing the fatigue of the person observing the stereoscopic image.

Furthermore, in a plural-eye image pickup apparatus employing a zoom lens, the zooming operation causes a shift in the optical axis, causing a parallax inappropriate for the stereoscopic observation and inducing fatigue of the observer.

SUMMARY OF THE INVENTION

In consideration of the foregoing, a first object of the present invention is to provide a plural-eye image pickup apparatus capable of achieving compactization of the apparatus, also eliminating play or the like in the mechanical control, and suppressing the fatigue in stereoscopic observation, resulting from the vibration in the image caused by the shaking of the holding hand, thereby always providing an image of high quality.

The above-mentioned object can be attained, according to a preferred embodiment of the present invention, by a plural-eye image pickup apparatus comprising plural image pickup systems for respectively taking the images of an object thereby providing image signals; a memory circuit for storing the plural image signals released from said plural imaging pickup systems; a convergence angle setting device for setting the convergence angle of said plural image taking systems; and a trimming circuit for respectively extracting, from the plural image signals stored in said memory circuit, signals of portions corresponding to the convergence angle set by said convergence angle setting device.

There is thus disclosed a configuration which effects electrical control of the convergence angle, in obtaining the images of the object with plural image pickup systems for the purpose of stereoscopic viewing or entry of the distance information.

A second object of the present invention is to provide a plural-eye image pickup apparatus capable, in taking the images of the object with plural image pickup optical system for the purpose of stereoscopic viewing or entry of distance information, of correcting the difference in phase between the images obtained by the respective image pickup optical systems, thereby suppressing the fatigue in stereoscopic viewing and facilitating the processing in the entry of distance information.

Also a third object of the present invention is to present deterioration of the image resulting from mechanical perturbation, thereby providing a stereoscopic image of high quality.

Still other objects of the present invention, and the features thereof, will become fully apparent from the following description, which is to be taken in conjunction with the attached drawings.

DETAILED DESCRIPTION OF THE PREFERRED EMBODIMENTS

Now the image pickup apparatus of the present invention will be clarified in detail by preferred embodiments thereof, with reference to the attached drawings.

Figure 1:
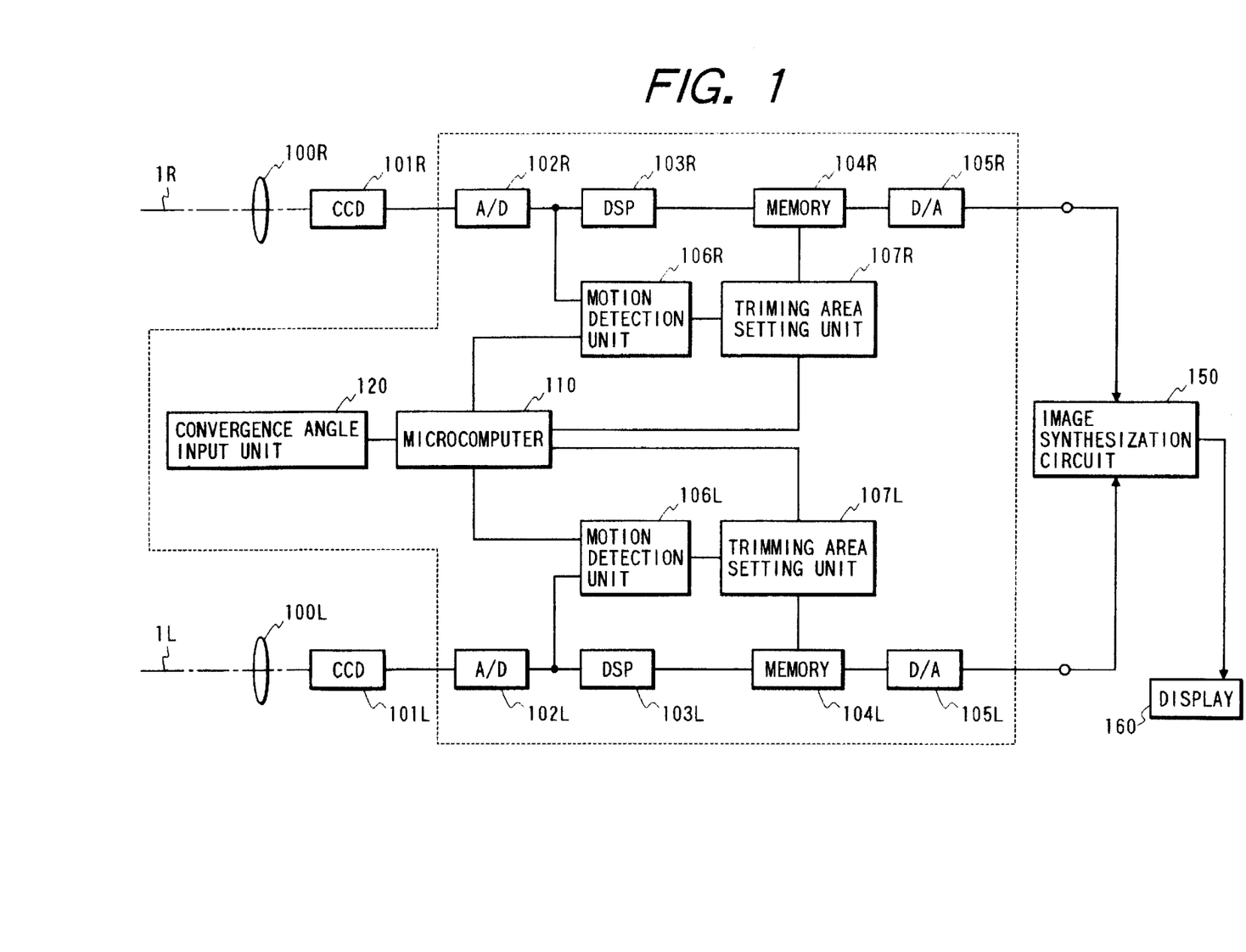
FIG. 1 is a block diagram showing a first embodiment of the present invention.

FIG. 1 is a block diagram showing a first embodiment of the present invention.

In FIG. 1, there are shown optical axes 1R, 1L of right and left image pickup systems; right and left image pickup lenses 100R, 100L; and CCDs 101R, 101L serving as image pickup elements for converting the optical images of an object into electrical signals, with a number of pixels larger than that used ordinarily for the NTSC standard. The image pickup elements are naturally not limited to the CCDs but can be of those of any other type.

A/D converters 102R, 102L convert the analog electrical signals, obtained from the CCDs 100R, 100L into digital signals.

103R, 103L are digital signal processors (DSP) and process the A/D converted electrical signals to generate suitable image signals.

Image memories 104R, 104L temporarily store the image signals generated by the DSPs 103R, 103L.

D/A converters 105R, 105L convert the digital image signals, read from the memories 104R, 104L, into analog image signals.

Motion detection units 106R, 106L detect the amount of motion between the fields (or frames) of the images respectively taken by the CCDs 101R, 101L. More specifically, motion vectors are determined by memorizing a feature image in a predetermined area in a field and effecting matching calculation with the image of a next field.

Trimming area setting units 107R, 107L control the write-in and read-out addresses of the memories 104R, 104L.

A microcomputer 110 controls the entire image pickup apparatus.

A convergence angle setting unit 120 sets the convergence angle of the image pickup systems at the image pickup operation. An image synthesis circuit 150 generates a stereoscopic image by synthesizing the left and right image signals output from the D/A converters 105R, 105L, and a display 160 displays the stereoscopic image.

Figure 2:
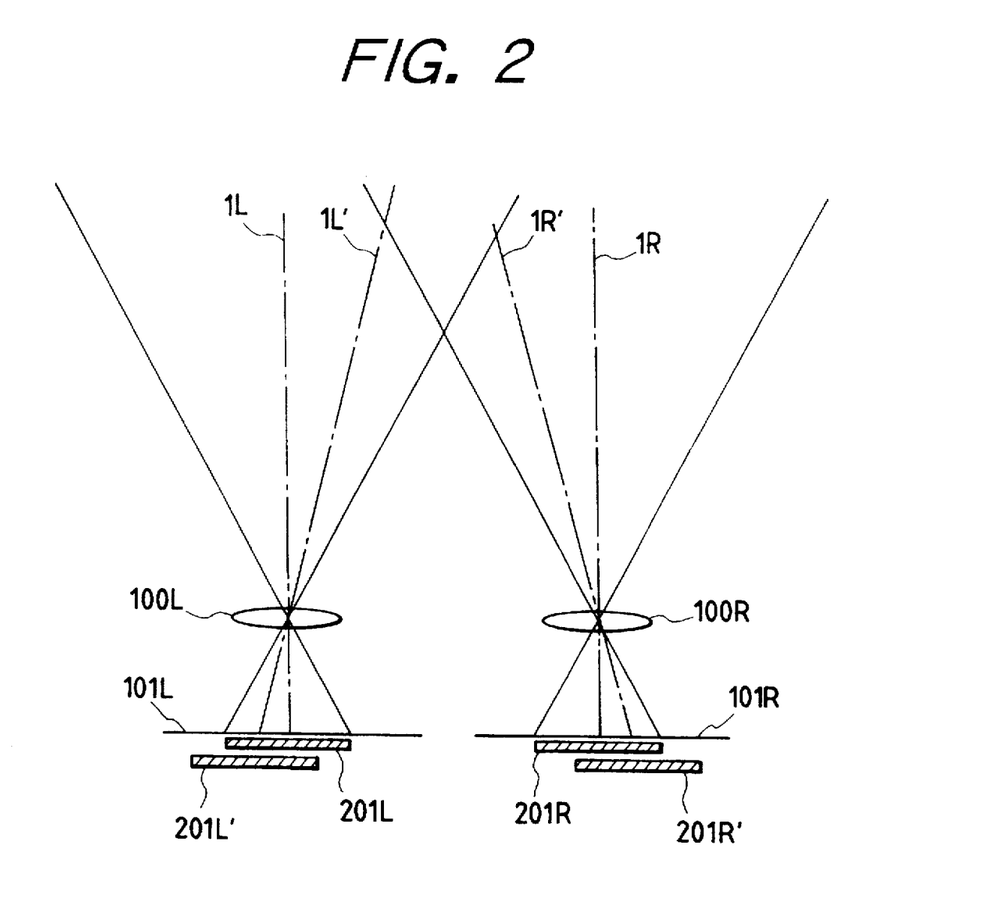
FIG. 2 is a schematic view, showing the outline of the convergence angle control.

FIG. 2 shows the working principle of the plural-eye image pickup apparatus of the present invention, wherein 201R, 201R', 201L, 201L' indicate trimming areas, taken with the ordinary aspect ratio of 4:3, on the image pickup planes of the CCDs 101R, 101L. The trimming areas 201R, 201L correspond to the optical axes 1R, 1L, while those 201R', 201L' correspond to the optical axes 1R', 1L'.

In the present invention, the convergence angle is controlled by trimming the images taken by the CCDs 101R, 101L. More specifically, the control of the convergence angle is achieved by shifting the center positions of the trimming areas 201R, 201L to obtain the trimming areas 201R', 201L' where the optical axes 1R, 1L are practically shifted to 1R', 1L'.

Consequently the control of the convergence angle can be achieved electrically and does not require a mechanism therefor, and there can be avoided the image deterioration or the error resulting from mechanical errors.

In the following there will be given an explanation on the function of the apparatus of the present invention.

Optical images of the object, obtained through the image pickup lenses 100R, 100L, are focused on the image pickup planes of the CCDs 101R, 101L and are converted into analog electrical image signals. These image signals are converted by the A/D converters 102R, 102L into digital image signals, which are then supplied to the DSPs 103R, 103L.

The DSPs 103R, 103L effect digital signal processing to generate suitable image signals, which are supplied to the memories 104R, 104L and to the motion detection units 106R, 106L.

Figures 3A, 3B, 3C:
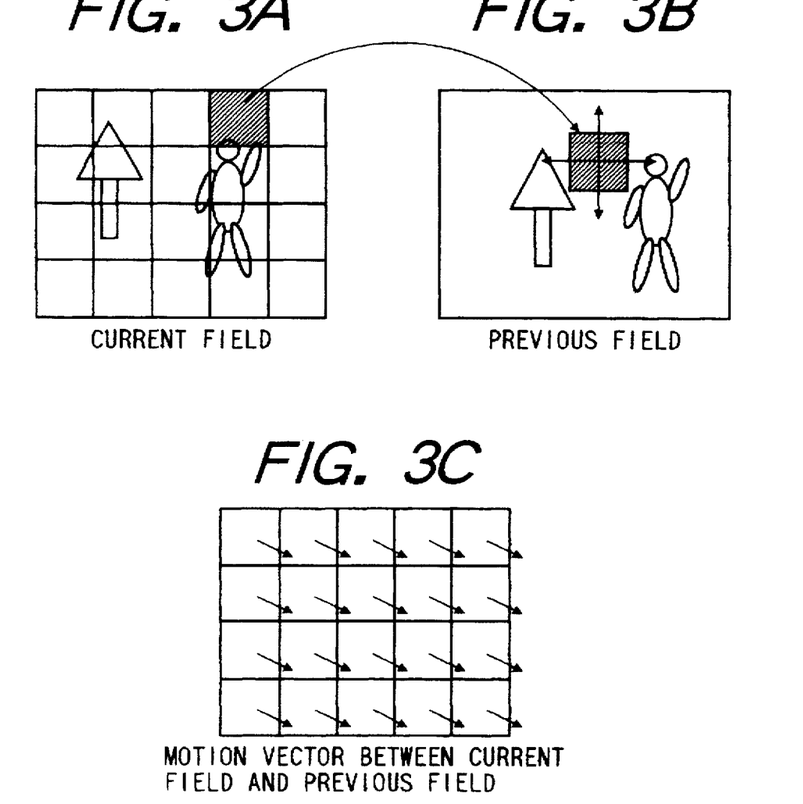
FIGS. 3A to 3C are views showing the outline of a matching method.

The motion detection units 106R, 106L detect the motion vectors between the image of the current field and that of the preceding field, with the principle shown in FIGS. 3A to 3C.

As shown in FIG. 3A, the image signal of the current field is divided, within the image area, into plural blocks of a suitable size. The image signal of each divided block is subjected to template matching with the image signal of the preceding field as shown in FIG. 3B, and there is determined a position where the correlation becomes highest. The motion vectors of the blocks can be determined as shown in FIG. 3C, by effecting the above-mentioned process to each block.

The motion detection units 106R, 106L unify the motion vectors of the blocks, then determine a representative value (x, y) of the motion vectors of the current field, from the average and center value of these motion vectors, and sends this representative value to the trimming area setting units 107R, 107L.

Figure 4:
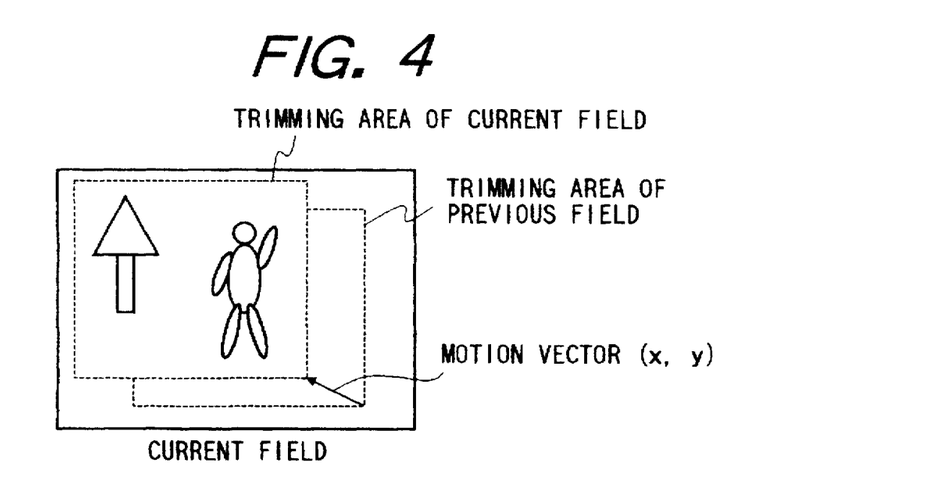
FIG. 4 is a schematic view showing the outline of correction of vibration.

FIG. 4 shows, as an example, the image signal of the current field stored in the memory 104R.

As the CCDs employed in the present embodiment are of a large area with a number of pixels larger than that ordinarily employed for the NTSC standard, it is possible to trim, from the image signal, a broken-lined area with an aspect ratio 4:3 as shown in FIG. 4, according to the representative value (x, y) of the motion vectors.

The convergence angle input unit 120 is provided with a dial or buttons, of which manipulation shifts the optical axes 1R, 1L from the parallel state shown in FIG. 2 to an inwardly converging state indicated by 1R', 1L'.

Upon receiving information on the change of the convergence angle from the convergence angle input unit 120, the microcomputer 110 provides the trimming area setting units 107R, 107L with a control signal.

Figure 5:
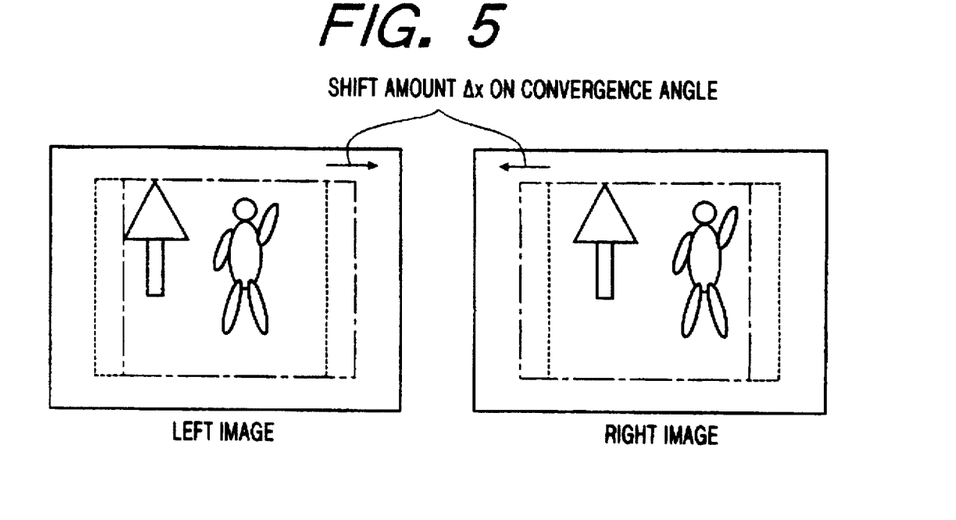
FIG. 5 is a schematic view showing the outline of convergence angle control by trimming.

FIG. 5 shows the outline of the change of the convergence angle by trimming, in case of a shift to the inward convergence as shown in FIG. 2. Based on the information from the convergence angle input unit 120, the microcomputer 110 provides the trimming area setting units 107R, 107L with an image shift amount $\Delta x$. In FIG. 5, the trimming areas are indicated by broken lines and chain lines.

The trimming area setting units 107R, 107L determines a final trimming area, based on the motion vector (x, y) from the motion detection units 106R, 106L and the convergence angle shift amount $\Delta x$ from the microcomputer 110.

Figure 6:
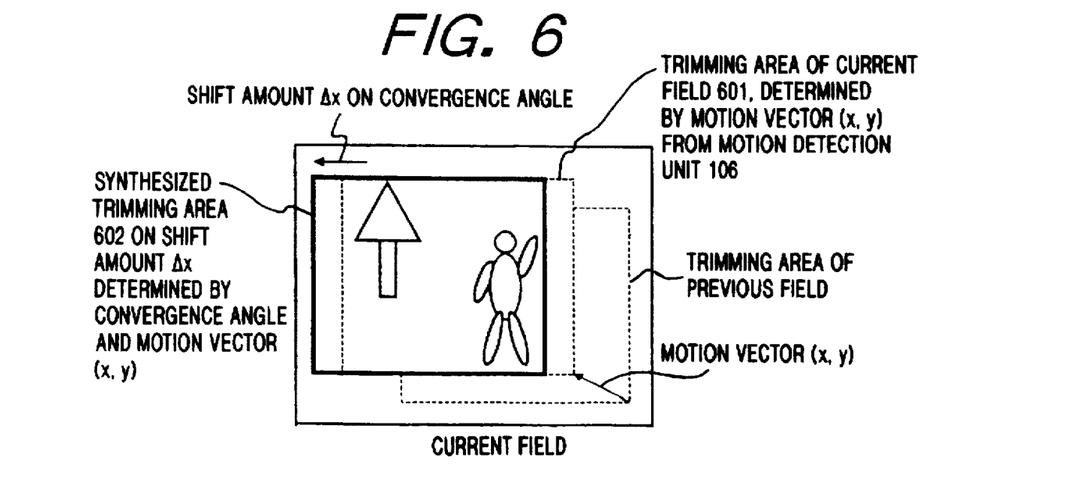
FIG. 6 is a schematic view showing the outline of the process by a trimming area setting unit.

FIG. 6 shows, as an example, a trimming area obtained in the trimming area setting units 107R, 107L by combining the motion vectors and the convergence angle shift amount. The same process is also conducted in the trimming area setting unit 107L.

In FIG. 6, the motion vector (x, y) represents image displacement caused by motion detected by the motion detection units 106R. A reference numeral 601 denotes a trimming area of the current field, which determined by only the motion vector detected by the motion detection unit 106. $\Delta x$ is shift amount for change of the convergence angle by trimming. The trimming area setting unit 107R further shifts the trimming area 601 determined by the motion vector, by $\Delta x$ to set a trimming area 602 which is provided by synthesizing the motion vector (x, y) and the shift amount $\Delta x$.

Then, based on the control signals obtained from the trimming area setting units 107R, 107L, parts of the images are read with trimming from the memories 104R, 104L and are supplied to the D/A converters 105R, 105L, which convert the digital image signals from the memories 104R, 104L into analog signals for output.

In this manner there can be obtained an image of high quality, corrected for the hand vibration, without relying on the complex mechanism for the convergence angle control.

The output signals of these D/A converters 105R, 105L are supplied to the image synthesis circuit 160 to enable stereoscopic viewing.

Figure 7:
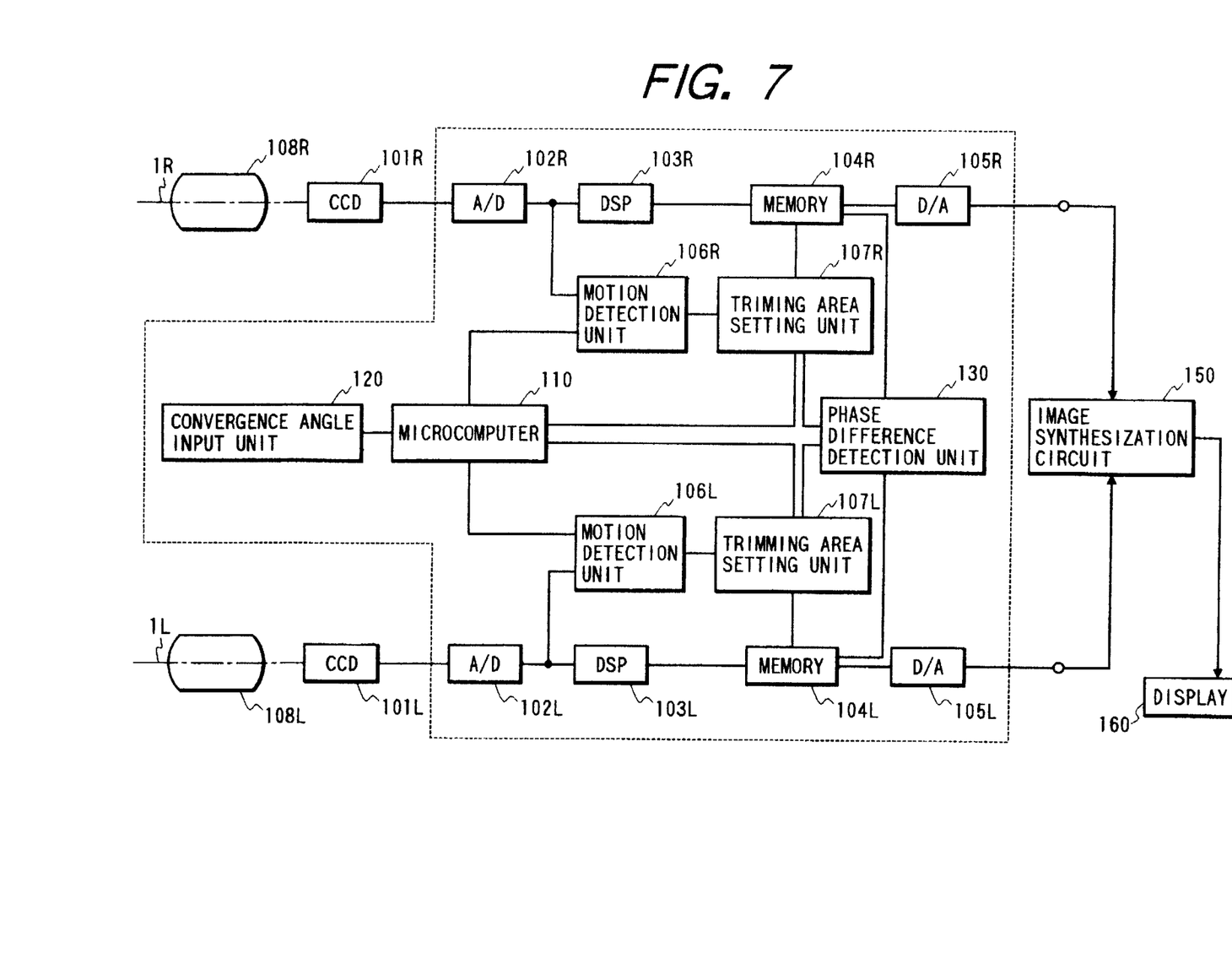
FIG. 7 is a block diagram showing a second embodiment of the present invention.

FIG. 7 is a block diagram of a second embodiment of the present invention, wherein components equivalent in function to those in the first embodiment are represented by same numbers and will not be explained further.

This embodiment is different from the first one in the use of zoom lenses 108R, 108L for the image pickup lenses and in the presence of a phase difference detection unit 130.

The phase difference detection unit 130 detects the phase difference of overlapping areas in the image signals of the memories 104R, 104L and sends a detection signal to the trimming area setting units 107R, 107L.

In case of image taking with zoom optical systems as in the apparatus of the present embodiment, a zooming operation results in a shift of the optical axes, thus generating an aberration in the registration between the images obtained by the respective image taking systems.

Figure 8:
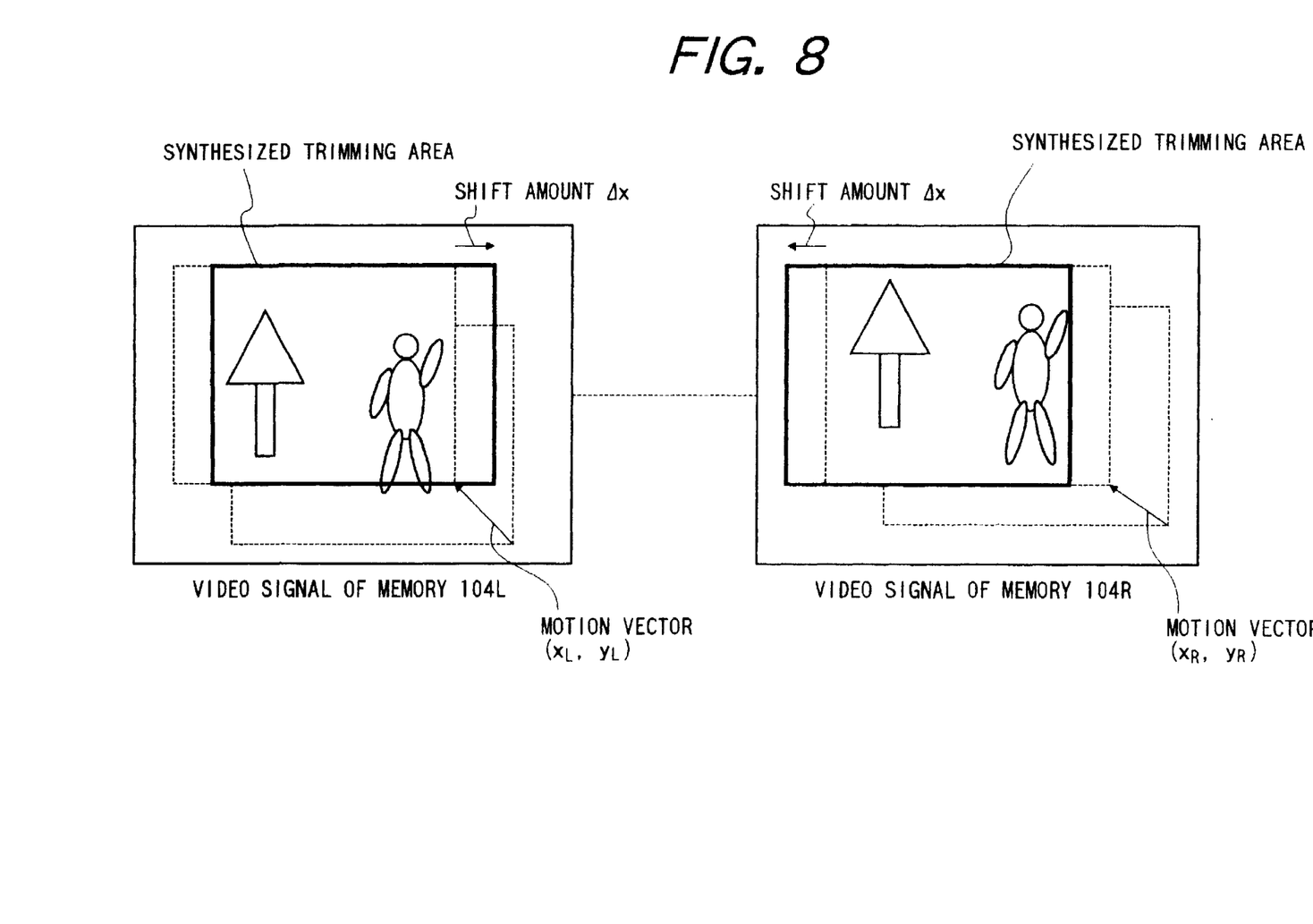
FIG. 8 is a schematic view showing the outline of the image signal to be trimmed.

FIG. 8 schematically shows the image signals in the memories 104R, 104L and the trimming area based on the motion vectors and the convergence angle control.

In case of effecting the correction for the vibration and the convergence angle control independently for each image signal as shown in FIG. 8, the phases of the images do not necessarily coincide mutually.

Figure 9:
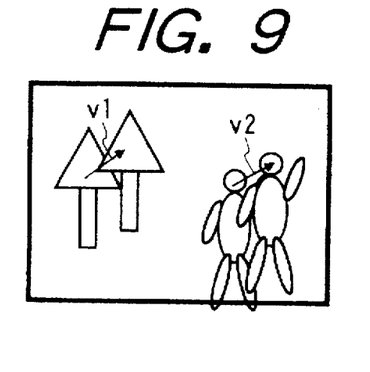
FIG. 9 is a schematic view showing the outline of the process of a phase difference detection unit.

FIG. 9 shows, in superposed manner, the trimming areas for the memories 104R, 104L shown in FIG. 8, wherein V1 and V2 are phase difference vectors to be explained later.

As will be apparent in FIG. 9, the images are mutually aberrated, and particularly the aberration in the vertical direction has to be corrected as it increases the fatigue in the stereoscopic observation.

The phase difference detection unit 130 receives, from the memories 104R, 104L, the image signals of the trimming areas determined from the motion vectors and the convergence angle control signal, and detects the phase differences in the vertical and horizontal directions, utilizing calculation of correlation or template matching on thus entered image signals.

FIG. 9 shows the vectors V1, V2, representing the detected phase differences. The phase difference may be determined for each pixel or for each of suitable blocks.

Figure 10A:
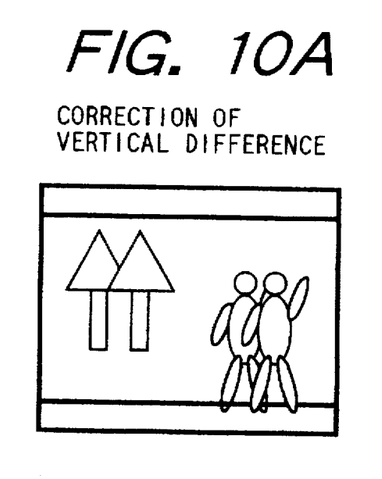
FIGS. 10A and 10B are schematic views showing the outline of a phase correcting method.
Figure 10B:
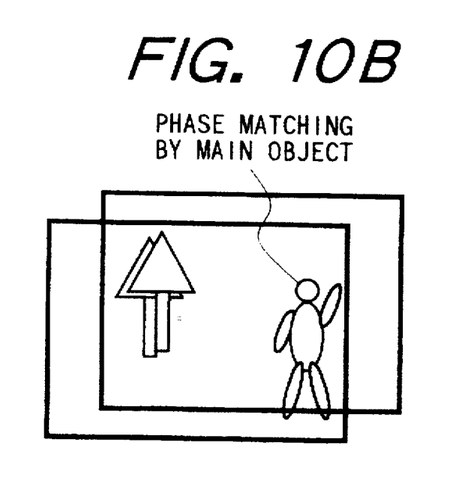

Then the phase difference detection unit 130 sets, based on thus determined phase difference, trimming areas so as to match the phase in the vertical direction as shown in FIGS. 10A and 10B, and sends control signals to the trimming area setting unit 107R, 107L.

Figure 11:
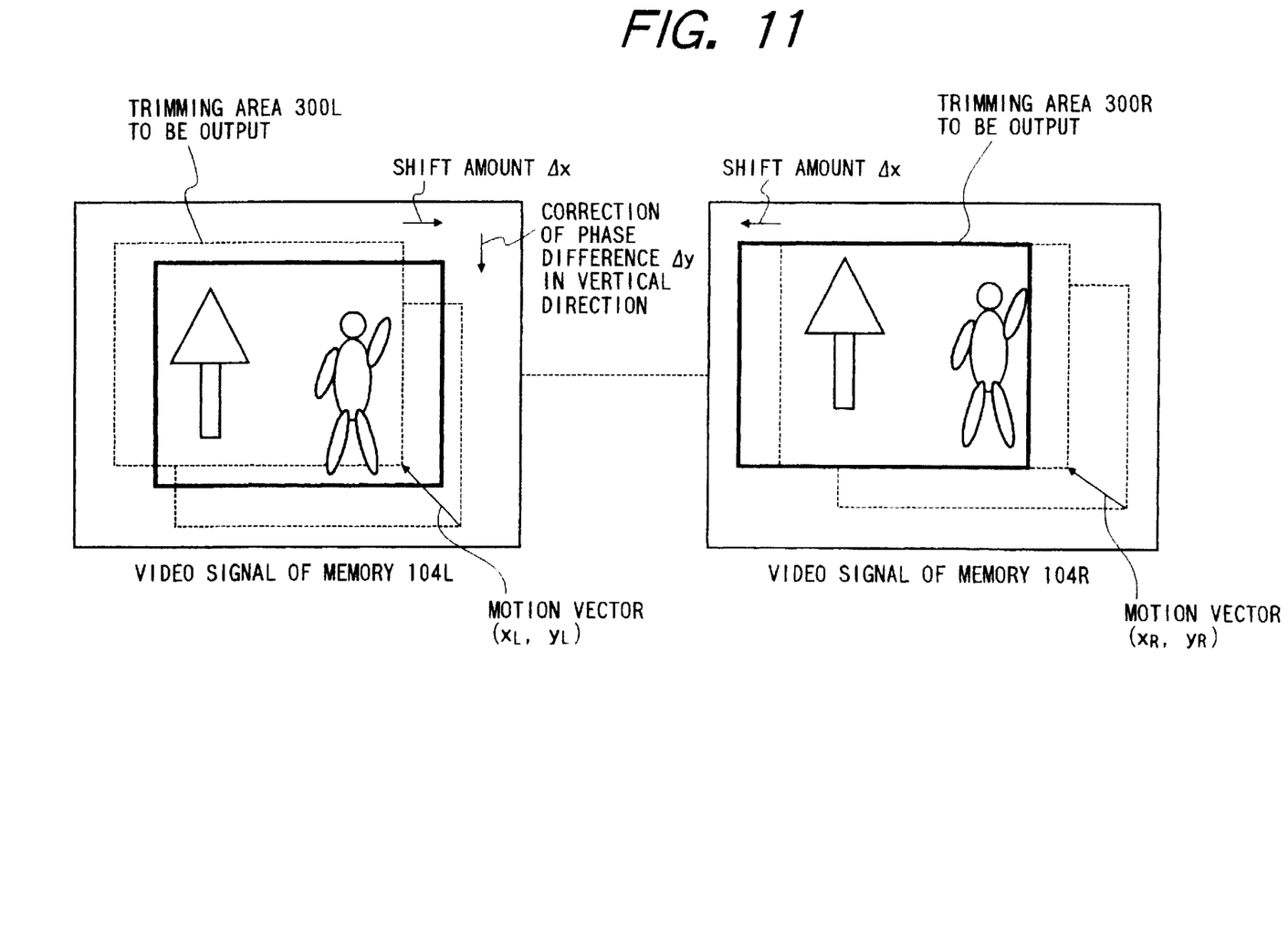
FIG. 11 is a schematic view showing the outline of the image signal to be trimmed.

FIG. 11 shows the outline of the phase difference correction, wherein 300R and 300L indicate the trimming areas obtained in consideration of the phase difference between the images.

The image signals of the trimming areas 300R, 300L are converted in the D/A converters 105R, 105L and released.

As explained in the foregoing, these embodiments enable the control of the convergence angle in electrical manner, without employing a mechanism such as motors. Thus the apparatus can be made smaller, and there can avoided the aberration of the images resulting from the mechanical errors, thereby realizing satisfactory stereoscopic viewing.

Also the foregoing embodiments allow to eliminate the vibration in images, resulting from the vibration of the hands holding the image pickup systems, thereby reducing the fatigue in the stereoscopic image viewing.

Furthermore, in case of using zoom lenses, the foregoing embodiments allow to eliminate the undesirable parallax, such as the vertical parallax based on the aberration of the optical axes in zooming operation, thereby reducing the fatigue in the stereoscopic viewing and alleviating the load of processing.

What is claimed is:

1. An image pickup apparatus comprising:
   a) plural image pickup means for picking up an image of an object and outputting image signals;
   b) memory means for storing plural image signals output from said image pickup means;
   c) convergence angle setting means for setting the convergence angle of said plural image pickup means;
   d) motion detection means for detecting motion information of the image; and
   e) extracting means for extracting, from each of the plural image signals stored in said memory means, the signal of a portion according to the convergence angle set by said convergence angle setting means and the motion information detected by said motion detection means.

2. An image pickup apparatus according to claim 1, wherein said motion detection means detects motion vectors of the image, on each of the plural image signals output from said plural image pickup means, wherein said extracting means is adapted to control areas of extraction of the plural image signals stored in said memory means, based on the convergence angle set by said convergence angle setting means and the information of the motion vectors detected by said motion detection means.

3. An image pickup apparatus according to claim 2, wherein said motion detection means is adapted to detect the motion vectors by a matching calculation of a feature image between two consecutive fields, thereby detecting the motion of the image.

4. An image pickup apparatus according to claim 1, wherein said motion detection means includes phase difference detection means for detecting the phase difference between the plural image signals obtained by said image pickup means, wherein said extracting means is adapted to control areas of extraction of the plural image signals stored in said memory means, based on the convergence angle set by said convergence angle setting means and the information of the phase difference detected by said phase difference detection means.

5. An image pickup apparatus according to claim 1, wherein said convergence angle setting means is adapted to manually set the convergence angle, and said extracting means is adapted to vary the image readout position according to the convergence angle set by said convergence angle setting means.

6. An image pickup apparatus according to claim 4, wherein said phase difference detection means is adapted to detect the phase difference between images, in an overlapping area of the images stored in said memory means and supply said extracting means with said phase difference.

7. An image pickup apparatus according to claim 6, further comprising zoom means.

8. An image pickup apparatus comprising:
   a) left and right image pickup optical systems for picking up an image of an object and outputting image signals;
   b) left and right image pickup elements for effecting photoelectric conversion of the left and right images, focused through said image pickup optical systems, thereby outputting image signals;
   c) left and right A/D converters for converting the image signals output from said left and right pickup elements;
   d) left and right memories for respectively storing the image signals output from said left and right A/D converters;
   e) a convergence angle setting unit for setting the convergence angle of said left and right image pickup optical systems;

f) motion detecting means for detecting motion information of the image; and g) a microcomputer for effecting a trimming process for extracting. from each of the plural image signals stored in said memories, the signal of a portion according to the convergence angle set by said convergence angle setting unit and the motion information detected by said motion detection means.

9. An image pickup apparatus according to claim 8, wherein said motion detecting means detects motion vectors of the image, on each of the plural image signals output from said plural image sensors, wherein said microcomputer is adapted to control areas of extraction of the plural image signals stored in said memory means, based on the convergence angle set by said convergence angle setting unit and the information of the motion vectors detected by said motion detecting circuit.

10. An image pickup apparatus according to claim 9, wherein said motion detecting circuit is adapted to detect the motion vectors by a matching calculation of a feature image between two consecutive fields, thereby detecting the motion of the image.

11. An image pickup apparatus according to claim 9, wherein said motion detection means includes a phase difference detecting circuit for detecting a phase difference between the plural image signals obtained by said image pickup elements, wherein the microcomputer is adapted to control areas of extraction of the plural image signals stored in said memories, based on the convergence angle set by said convergence angle setting unit and the information of the phase difference detected by said phase difference detecting circuit.

12. An image pickup apparatus according to claim 8, wherein said convergence angle setting unit is adapted to manually set the convergence angle, and said microcomputer is adapted to vary the image readout positions in said memories according to the convergence angle set by said convergence angle setting unit.

13. An image pickup apparatus according to claim 11, wherein said phase difference detecting circuit is adapted to detect the phase difference between images, in an overlapping area of the images stored in said memories and supply said microcomputer with said phase difference.

14. An image pickup apparatus according to claim 13, wherein said image pickup optical systems are zoom lenses.

15. An image pickup apparatus according to claim 8, further comprising an image synthesizing circuit for synthesizing the image signals output from said memories, thereby generating a stereoscopic image.

16. An image pickup apparatus according to claim 15, further comprising a display for displaying the output of said image synthesizing circuit.

17. An image pickup apparatus, comprising:

(a) a plurality of image pickup systems for picking up an image of an object and outputting a plurality of video signals;

(b) a memory for storing the plurality of video signals output from said plurality of image pickup systems;

(c) a motion detection unit for detecting motion information of the image;

(d) a convergence angle setting unit for electronically variably setting convergence angle of said plurality of image pickup systems; and (e) a microcomputer for controlling a read-out range of each of the plurality of video signals stored in said memory on the basis of the convergence angle set by said convergence angle setting unit and the motion information detected by said motion detection unit and for synthesizing signals corresponding to the read-out ranges.

18. An apparatus according to claim 17, wherein said motion detection unit detects a motion vector of an image corresponding to each of the plurality of video signals output from said plurality of image pickup systems and said microcomputer controls the read-out ranges of the plurality of video signals stored in said memory, based on the convergence angle set by said convergence angle setting unit and the motion vector detected by said motion detection unit.

19. An apparatus according to claim 18, wherein said motion detection unit detects the motion vector by a matching operating of feature images between two succesive fields and thereby detecting the motion of the image.

20. An apparatus according to claim 17, further comprising a phase difference detection unit for detecting phase difference detection unit for detecting phase difference between the plurality of video signals output from said plurality of image pickup systems, wherein said microcomputer controls the read-out ranges of the plurality of video signals stored in said memory, based on the convergence angle set by said convergence angle setting unit and the phase difference detected by said phase difference detection unit.

21. An apparatus according to claim 17, wherein the read-out range of said memory set by said convergence angle setting unit can be set manually by an operator.

22. An apparatus according to claim 20, wherein said phase difference detection unit detects the phase difference of an image in an overlap region between the images stored in said memory and supplies the detected phase difference to said microcomputer.

23. An apparatus according to claim 17, further comprising a zoom unit, wherein said convergence angle setting unit and said microcomputer change the read-out range of the image according to magnification provided by said zoom unit.

* * * * *

UNITED STATES PATENT AND TRADEMARK OFFICE
CERTIFICATE OF CORRECTION

PATENT NO. : 5,786,847
DATED : July 28, 1998
INVENTOR(S) : TATSUSHI KATAYAMA ET AL.

It is certified that error appears in the above-identified patent and that said Letters Patent is hereby corrected as shown below:

<u>ON THE COVER PAGE AT [56], ATTORNEY, AGENT OR FIRM</u>

"Fitzpatrick,Cella, Harper & Scinto" should read --Fitzpatrick, Cella, Harper & Scinto--.

<u>SHEET 1</u>

FIGURE 1, "TRIMING" should read --TRIMMING--.

<u>SHEET 5</u>

FIGURE 7, "TRIMING" should read --TRIMMING--.

<u>COLUMN 4</u>

Line 7, "sends" should read --send--;
Line 34, "determines" should read --determine--;
Line 46, "which" should read --which is--.

Signed and Sealed this

Twenty-fifth Day of May, 1999

Attest:

Q. TODD DICKINSON

*Attesting Officer*          *Acting Commissioner of Patents and Trademarks*